United States Patent
Guo et al.

(10) Patent No.: US 10,237,149 B1
(45) Date of Patent: Mar. 19, 2019

(54) APPLICATION-LEVEL MONITORING AND PROFILING SERVICES IN COMPUTING ENVIRONMENTS

(71) Applicants: EMC Corporation, Hopkinton, MA (US); EMC IP Holding Company LLC, Hopkinton, MA (US)

(72) Inventors: Xiaoyan Guo, Beijing (CN); Yu Cao, Beijing (CN); Simon Tao, Shanghai (CN); Sanping Li, Beijing (CN); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 187 days.

(21) Appl. No.: 15/075,856

(22) Filed: Mar. 21, 2016

(51) Int. Cl.
  G06F 9/44 (2018.01)
  H04L 12/26 (2006.01)
  H04L 29/08 (2006.01)
  G06F 17/30 (2006.01)

(52) U.S. Cl.
  CPC ........ H04L 43/04 (2013.01); G06F 17/30899 (2013.01); H04L 43/0876 (2013.01); H04L 67/025 (2013.01)

(58) Field of Classification Search
  CPC .................... G06F 17/30899; H04L 67/025
  See application file for complete search history.

(56) References Cited

U.S. PATENT DOCUMENTS

| | | | | |
|---|---|---|---|---|
| 7,627,671 B1* | 12/2009 | Palma | ................. | G06F 11/3616 709/223 |
| 7,962,633 B1* | 6/2011 | Sidebottom | ............ | G06Q 10/10 709/223 |
| 8,631,458 B1* | 1/2014 | Banerjee | ............. | G06F 9/45558 718/1 |
| 8,719,804 B2* | 5/2014 | Jain | ..................... | G06F 11/3006 717/117 |

(Continued)

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

*Primary Examiner* — Chirag R Patel
(74) *Attorney, Agent, or Firm* — Ryan, Mason & Lewis, LLP

(57) ABSTRACT

A computing platform comprises one or more virtual compute elements, virtual storage elements, and virtual networking elements, wherein one or more application programs of one or more tenants execute on the computing platform. An application program monitoring service layer comprises a set of monitoring service modules selectable by the one or more tenants. The monitoring service modules are configured to provide different application-level monitoring functions, for a given tenant, to monitor the execution of at least one installed application program of the given tenant. A selected monitoring service module executes in at least one virtual compute element that is part of a set of one or more virtual compute elements currently executing the at least one installed application program of the given tenant being (Continued)

monitored. The application program monitoring service layer further comprises a data collecting service module configured to receive application data from the monitoring service module.

20 Claims, 4 Drawing Sheets

(56) References Cited

U.S. PATENT DOCUMENTS

| | | | | |
|---|---|---|---|---|
| 2011/0295986 | A1* | 12/2011 | Ferris | G06F 9/5072 709/222 |
| 2012/0260040 | A1* | 10/2012 | Mallge | G06F 17/30584 711/117 |
| 2013/0007265 | A1* | 1/2013 | Benedetti | H04L 67/1097 709/224 |

* cited by examiner

APPLICATION-LEVEL MONITORING AND PROFILING SERVICES IN COMPUTING ENVIRONMENTS

FIELD

The field relates generally to computing environments, and more particularly to monitoring and profiling in such computing environments.

BACKGROUND

Computing environments, such as data centers, frequently employ cloud computing platforms, where "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Cloud-based data centers are deployed and managed by cloud service providers, who provide a computing environment for customers (tenants) to run their application programs (e.g. business applications or otherwise).

Current cloud-based data centers typically have services or tools to monitor and meter the system-level metrics of the cloud infrastructure, e.g., physical resource utilization, operation intelligence, deployment topology, etc. For example, these monitoring tools include, but are not limited to, Ganglia, Nagios, AWS CloudWatch, OpenStack Ceilometer, etc. These tools are monitoring systems for cloud providers to gain system-wide visibility into the cloud platform and its infrastructure.

SUMMARY

Embodiments of the invention provide techniques for application-level monitoring and profiling in a computing environment.

For example, in one embodiment, a system comprises the following elements. A computing platform, implemented on one or more processing devices, comprises one or more virtual compute elements, one or more virtual storage elements, and one or more virtual networking elements, wherein one or more application programs of one or more tenants execute on the computing platform. An application program monitoring service layer, implemented on the one or more processing devices and operatively coupled to the computing platform, comprises a set of monitoring service modules selectable by the one or more tenants. The monitoring service modules are configured to provide different application-level monitoring functions, for a given tenant, to monitor the execution of at least one installed application program of the given tenant. A selected monitoring service module executes in at least one virtual compute element that is part of a set of one or more virtual compute elements currently executing the at least one installed application program of the given tenant being monitored. The application program monitoring service layer further comprises a data collecting service module, operatively coupled to the set of monitoring service modules, wherein the data collecting service module is configured to receive application data from the monitoring service module executing in the at least one virtual compute element that is part of the set of one or more virtual compute elements currently executing the installed application program being monitored.

The application program monitoring service layer may further comprise an agreement mechanism for enabling the one or more tenants to agree with a service provider of the computing platform on application-level monitoring functions to be provided in the application program monitoring service layer.

The application program monitoring service layer may further comprise application data analytics modules (profiling modules) configured to provide application-level analysis results to at least one of the tenants and a service provider of the computing platform.

Advantageously, illustrative embodiments provide techniques for application-level monitoring and profiling which enable cloud service providers to obtain a complete overview of cloud infrastructure including running applications, while the tenant users can see their application metrics and status and can define and customize the applications to monitor and profile.

These and other features and advantages of the invention will become more readily apparent from the accompanying drawings and the following detailed description.

DETAILED DESCRIPTION

Figure 1:
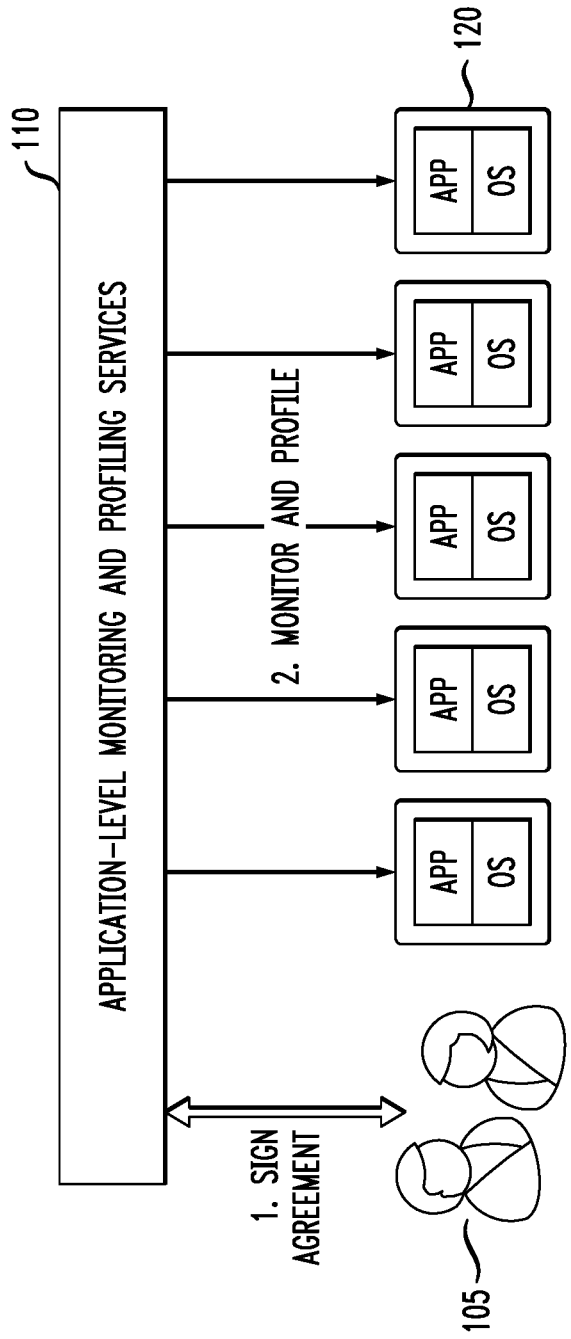
FIG. 1 illustrates an application-level monitoring and profiling service layer and computing platform environment, according to an embodiment of the invention.

Illustrative embodiments may be described herein with reference to exemplary cloud infrastructure, data repositories, data centers, data processing systems, computing systems, data storage systems and associated servers, computers, storage units, storage arrays, and devices such as processing devices. It is to be appreciated, however, that embodiments of the invention are not restricted to use with the particular illustrative system and device configurations shown. Moreover, the phrases "cloud infrastructure," "cloud platform," "data repository," "data center," "data processing system," "data storage system," "computing system," "computing environment," and the like as used herein are intended to be broadly construed, so as to encompass, for example, private, public or hybrid (part private and part public) cloud computing or storage systems, as well as other types of systems comprising distributed virtual infrastructure. However, a given embodiment may more generally comprise any arrangement of one or more processing devices.

As mentioned above, existing cloud-based data centers provide monitoring tools that enable cloud service providers to gain system-wide visibility into the cloud platform and infrastructure.

However, these existing services do not have the capability to realize application-level monitoring and profiling.

In fact, tenants' applications typically run inside their own virtual machines (VMs) or containers. The tenants must manually develop different kinds of monitoring services for different applications in order to collect and profile the application metrics. However, the monitoring services enabled by the cloud providers do not have the privilege or control to install and deploy such agents inside tenants' VMs/containers to collect the users' data.

To overcome the above and other drawbacks of existing approaches, embodiments of the invention provide an application-level monitoring and profiling-as-a-service system for a cloud platform.

As will be illustratively explained in detail below, embodiments propose a mechanism for a cloud service provider and tenants to reach a monitoring and profiling agreement. With the agreement, the tenants can decide whether to allow the platform to collect and monitor their applications according to their business context. With the mechanism and agreement, the privacy and security issues of monitoring tenants' applications is advantageously addressed.

Furthermore, embodiments of the invention provide a corresponding service catalog to offer different kinds of monitoring services, which are able to monitor and profile different kinds of applications. The cloud service provider can offer certain templates for tenants to choose which monitoring services can be allowed to deploy inside their VMs/containers. Therefore, these monitoring and profiling services can continuously monitor and collect various metrics of specified applications.

With such mechanism, the cloud service providers are able to collect corresponding data with respect to tenants' applications. The tenants are able to access and employ this data through application programming interfaces (APIs) or graphical user interfaces (GUIs) provided by cloud providers.

Advantageously, application-level monitoring and profiling services according to embodiments of the invention benefit both the cloud service providers (SP) and the cloud tenants.

For tenants (cloud consumers), application-level monitoring and profiling services save efforts to build and deploy their own monitoring agents manually. They also do not need to learn significant amounts of expertise knowledge and dive into the application kernel to develop such agents. It is particularly convenient for the tenants to monitor, understand and diagnose their running applications, and, as such, application-level monitoring and profiling services can provide tenants with notifications of various abnormal events and offer comprehensive application-level monitoring and profiling services reports.

For cloud service providers, application-level monitoring and profiling services enable them to employ the collected application data to generate statistics and conduct analytics in order to better understand and optimize their cloud infrastructure. With such statistics and analytics results, they can better understand the tenants' behavior and use habits.

Further, the collected application data can be utilized for different purposes. For example, the security of the cloud infrastructure can be enhanced by identifying suspicious and inconsistent metrics. The cloud service providers can tune their infrastructure for performance enhancements if they observe that certain types of applications are running slowly or failing frequently. Service providers can also derive and apply different resource provisioning schemes for different kinds of applications based on historical statistics and analytics.

It is realized herein that, for security and privacy reasons, cloud service providers are not directly allowed to monitor and gather data of applications running inside the tenants' own VMs/containers. Currently, there is no appropriate mechanism and service to enable cloud service provider monitoring and awareness of tenants' applications, although there are many tools to help them gather physical and virtual infrastructure metrics.

As mentioned above, the tenants may not have the ability to develop and deploy corresponding monitoring agents for the following reasons. First, a tenant would need to gain expert knowledge of the application to be monitored in order to implement the monitoring and profiling agents. Second, for different cloud infrastructure or guest operating systems, the methods to obtain specified monitoring data are varied. In certain scenarios, only the cloud service provider is able to collect certain data. In addition, it is tedious work and a waste of effort for the tenants to manually deploy agents to monitor and profile their applications.

As the requirements are different between application-level monitoring and infrastructure-level monitoring, the system design and infrastructure of traditional monitoring systems is not suitable for application-level monitoring. Thus, embodiments of the invention address application-level requirements such as, e.g., scalability, security and privacy, and flexibility. With respect to the scalability requirement, the number of applications to be monitored in a cloud is particularly large. Thus, a scalable design is highly demanded. With respect to the security and privacy requirement, the monitored application data belongs to tenants. It should be stored in isolation from other data. The system should guarantee the security and privacy of this type of data. With respect to the flexibility requirement, the monitored applications are owned and controlled by the tenants. They may start, stop, or fail at any time. This poses a great challenge to build such a service platform and to deploy monitoring services.

Accordingly, embodiments of the invention provide a new service layer in a cloud platform, i.e., monitoring and profiling as a service layer, on top of the cloud architecture. The service layer helps the tenants and cloud service providers address the tasks of application monitoring and profiling. The tenant users can exploit this service layer to monitor there running applications, to diagnose applications, and to optimize applications. In addition, the cloud service providers can use this service layer to monitor the resource usage and utilization of their infrastructure, to optimize the resource scheduling and allocation, and hence to provide a better computing platform and services to tenants.

FIG. 1 illustrates an application-level monitoring and profiling service layer and computing platform environment, according to an embodiment of the invention. As shown in environment 100, application-level monitoring and profiling service layer 110 is operatively coupled to a set of applications 120 executing on an operating system(s) of a computing platform. In an illustrative embodiment, the applications are executing on VMs that are managed by a hypervisor. Alternatively, the applications can be executing in other virtual compute elements such as containers, as will be explained further below. The application-level monitoring and profiling services layer 110 also provides an agreement mechanism whereby user 105 (e.g., tenants and service providers) can agree about the services that the service layer provides and enable the tenants to give specific permissions to the service provider to collect data from their applications.

More particularly, due to privacy and security issues, the service providers are not directly allowed to monitor and gather the data of applications running inside the tenants' VMs/containers. As shown in FIG. 1, a data monitoring and profiling contract (agreement) is agreed upon and signed between the service provider and tenants. The agreement process can be performed online through the service layer 110, offline, or some combination thereof. By signing an agreement with tenants, the service provider can obtain the user permission to collect corresponding application data. The tenants can decide whether to expose their applications to the service provider according to their business context and their intentions. If having the service provider monitor and profile their applications does not lead to a privacy problem, and tenants wish to utilize these monitoring services, the tenants can sign the agreement with the service provider (step 1). Then, the application-level monitoring and profiling service layer 110 monitors and profiles (step 2) the tenants' applications 120.

While FIG. 2 described below will illustrate details of the functionalities of the application-level monitoring and profiling service layer, an illustrative overall workflow in environment 100 is as follows:

1. Tenants install and deploy applications in their operating system (OS). This could be through VMs/containers or some combination thereof
2. The tenants request monitoring and profiling services from a service catalog. Various application monitoring services are implemented and provided by the service provider. In addition, a third-party or the tenants are allowed to implement monitoring services and are able to add to the service catalog. The platform provides an extensible and standard framework to develop such user-defined monitoring services.
3. The tenants configure and customize the monitoring services according to their actual requirements.
4. The monitoring/profiling services are installed and deployed on tenants' VMs/containers.
5. The deployed monitoring/profiling services run, collect data and upload data to the service layer.
6. The application-level monitoring and profiling as a service layer conducts various analytics and computes statistics on the monitoring data. The analytics results are used, for example, to offer the users advanced services, such as failure alerting, failure diagnosis, bottleneck detection, etc.
7. The tenants and cloud service providers exploit these data and analytics results through corresponding APIs:
    a. The tenants can access the raw monitoring and profiling data, and monitor their application in a monitoring GUI.
    b. The cloud service providers can find the bottlenecks in their infrastructure, evaluate infrastructure optimization suggestions in order to optimize the cloud platform, and change and optimize their resource provisioning and scheduling plan according to different types of applications.

Figure 2:
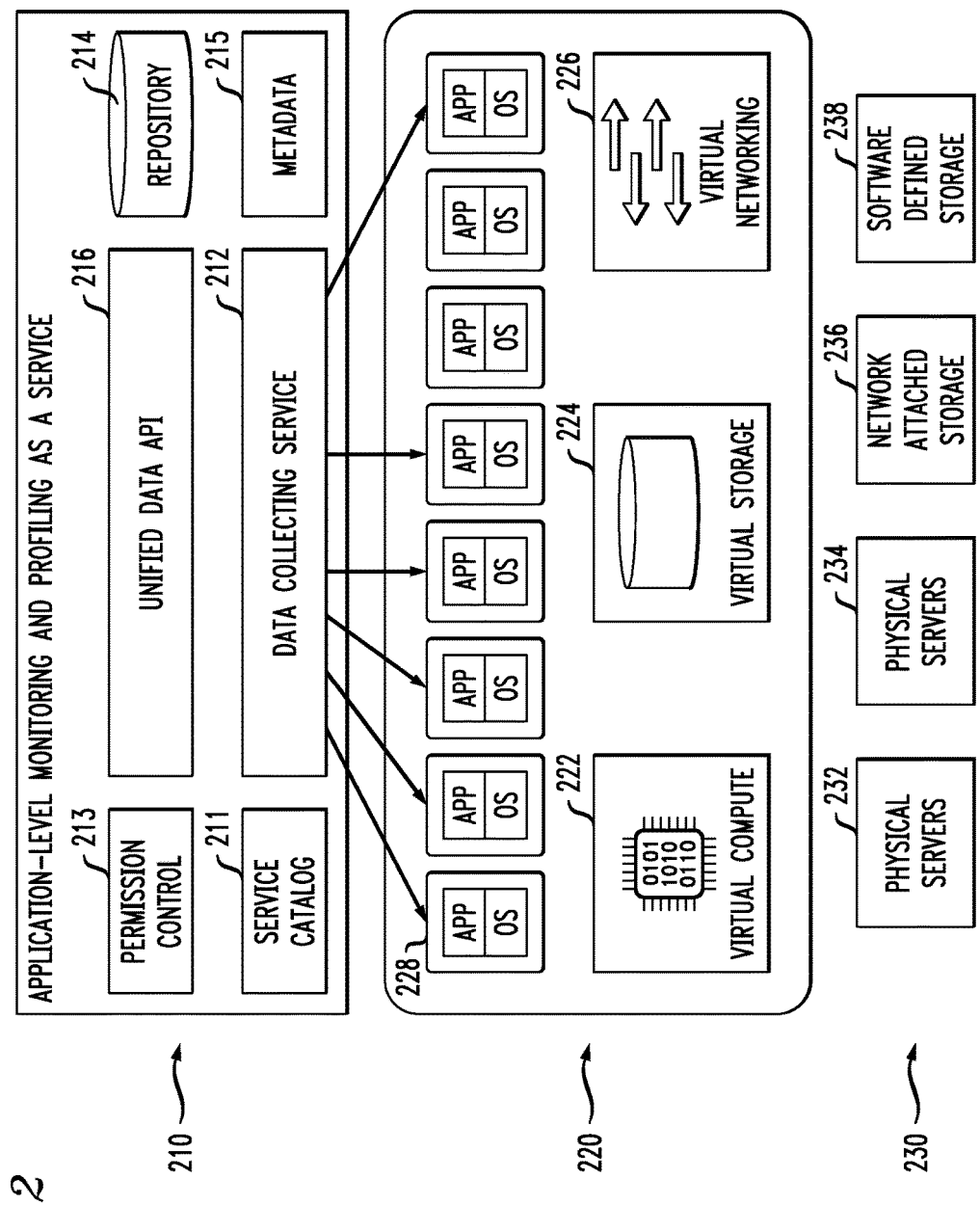
FIG. 2 illustrates details of an application-level monitoring and profiling service layer and computing platform environment, according to an embodiment of the invention.

FIG. 2 illustrates an application-level monitoring and profiling service layer and computing environment 200, according to an embodiment of the invention. It is to be understood that FIG. 2 is a more detailed depiction of environment 100 in FIG. 1.

As shown, an application-level monitoring and profiling service layer 210 is operatively coupled to a computing platform which is comprised of virtualization and application deployment layer 220 and physical infrastructure layer 230. As is known, the virtualization and application deployment layer 220 operates functionally on top of the physical infrastructure layer 230.

The virtualization and application deployment layer 220 comprises one or more virtual compute elements 222 (e.g., VMs/containers), one or more virtual storage elements 224, and one or more virtual networking elements 226. One or more tenant applications 228 are deployed and execute in this virtualization environment through the operating system(s) that instantiates the VMs/containers.

Also shown in FIG. 2, the physical infrastructure layer 230 comprises physical servers 232 and 234 and physical storage systems such as, by way of example only, network attached storage (NAS) devices 236 (e.g., Isilon® available from EMC Corporation of Hopkinton, Mass.), and software defined storage (SDS) devices 238 (e.g., ViPR® available from EMC Corporation of Hopkinton, Mass.). Other physical infrastructure not expressly shown can be part of layer 230.

In one illustrative embodiment, the computing platform can be a cloud platform with infrastructure as a service (IaaS) functionality. In such a case, layer 220 can be a virtualization cloud platform such as, but not limited to, OpenStack, VMWare vCloud® or Docker. These different cloud platforms offer the tenants on-demand self-service, resource pooling, elastic resource provision and scheduling, etc. Large numbers of VMs/containers provisioned to tenants are running on top of these virtualized resources. As mentioned above, the tenants deploy different applications inside these VMs/containers.

Turning now to the application-level monitoring and profiling service layer 210, as shown, layer 210 comprises a service catalog module 211, a data collecting service module 212, a permission control module 213, an application data repository 214, a metadata repository 215, and a unified application programming interface (API) module 216. Each module will now be further described in detail below.

Service catalog module 211 comprises a set of monitoring service modules selectable from the catalog by a tenant. The selected monitoring service module runs inside one or more of the tenant's own VMs or containers which are part of a set of one or more VMs/containers currently executing the application being monitored. The monitoring service module monitors and collects different application data and then sends the application data to the collecting service module 212 of the service layer 210. There are different kinds of tenant-selectable monitoring service modules for different types of applications. When the tenants request certain monitoring services, corresponding installation and deployment packages (service modules) are downloaded and deployed into their VMs/containers. In addition, the tenants or system administrators can develop new types of services to extend the service catalog 211. The monitoring service design follows an extensible design so that the tenants can easily develop standardized monitoring and profiling services.

It is to be understood that profiling services can be part of the functionality implemented on the modules deployed on the tenants' VMs/containers. Profiling services may include, but are not limited to, analytics executed on collected data to compute application performance metrics and statistics from the collected data, as mentioned above. Alternatively, the profiling operations can be implemented via the service catalog 211 at layer 210 from the collected data stored in application data repository 214 rather than at the VMs/containers in layer 220. The profiling data can then be stored in data repository 214.

Advantageously, a large number of monitoring and profiling services can be provided by layer 210. These services are preferably organized as different catalog categories in service catalog 211 including, but not limited to, error monitoring, usage monitoring, etc.

The data collecting service module 212 receives the data collected by the monitoring service modules deployed in tenants VMs/containers, and then persists and stores the application data in data repository 214. As the number of tenants' VMs/containers and applications can be extremely large in a cloud platform, the data collecting service preferably has a scalable and distributed design.

The permission control module 213 grants, controls, and limits the permissions of both the service provider and tenants. For tenant-defined and third-party monitoring service implementations, module 213 reviews the implementation to guarantee that it does not violate agreed-upon permission controls (e.g., agreed upon in step 1 of FIG. 1). Authorization is applied to obtain the access control privilege to collect corresponding data with administrator or specific permissions. For the service providers, module 213 applies for and complies with the permissions customized by the tenants, which define the rules specifying what data can be collected and how the data can be collected by the service provider. In addition, the module 213 creates and maintains an audit record so as to track the accessing behaviors of both the tenant and the service provider and to detect abnormal and unauthorized activities/events.

The application data repository 214 is used to store monitored/collected data. For different data timeliness, the repository is preferably of a multi-tiered storage design. Different data with different temperature (e.g., frequency of access) is stored on different storage tiers. In addition, for older data or colder data, the repository 214 automatically and periodically performs data retention and data archiving operations.

Metadata repository 215 stores the metadata (i.e., data about other data, in this case, data about monitored and profiled application data) derived from the monitoring and profiling operations, which includes, but is not limited to, information indicating data owners, data sources, collecting time, metric units, data timeliness, etc.

The unified data API 216 provides users (e.g., tenants, service provider, third-parties, etc.) a unified data accessing API which allows the users to conveniently access collected data and the service catalog. The API varies based on different requirements for different users. The API can be a representational state transfer (REST or RESTful) API. The API can also support a file transmission protocol which is capable of transferring large amounts of data.

It is to be understood that there are diverse sources of the monitoring and profiling services provided by layer 210. Application developers can implement functional agents to monitor or profile their applications. These agents can be integrated into the service catalog 211. The service provider can contemplate most of the monitoring services needed for prevalent applications. In addition, the tenants can also implement corresponding monitoring services and register them into the service catalog. The service catalog design is also extensible.

The tenants can request the service catalog 211 to deploy any corresponding services in their own VMs/containers. The installation and deployment can be automatic and transparent to the tenants.

As the quantity of monitoring objects in environment 200 can be much larger than that of traditional monitoring systems, the service architecture adopts a scalable and distributed design, in order to be able to deal with the large number of monitoring tasks.

The collecting services are deployed with the tenants' resources. For each tenant, the cloud platform will deploy one or more VM/container along with tenant's VMs/containers. In this VM/container, the collecting service is registered and running. This collecting service only receives and collects data with respect to this tenant's applications. In this way, when a tenant is allocated with some resources, the system will automatically allocate a VM/container for this tenant. After that, the collecting service will be started when this tenant applies the proposed service to monitor their applications.

The processing capability of each VM/container is configured and fixed with a default number of collecting tasks. When a tenant's monitoring tasks are more than this configured number, the system will be automatically scaled out to extend the capability. In addition, when the number of monitoring tasks is decreased, the system will automatically scale in to free unneeded resources.

In a cloud environment, there are various tenant users with numerous applications, and diverse requirements of using these applications. Therefore, there are a wide variety of monitored objects. As such, the system requires an extensible and customizable design for the monitoring metrics and meters. First, the system provides a rich built-in monitoring metric definition. Second, the newly added metrics cannot affect the normal running of current system, and also cannot affect the previous deployed agents. Therefore, a self-explanatory language is preferred to define the monitoring metrics, such as JavaScript Object Notation (JSON) or eXtensible Markup Language (XML).

In current cloud platforms, new applications are emerging in an endless stream. Hence, new monitoring agents will be implemented and added into the system. As such, an extensible monitoring agent design is also highly desirable. For different users, the method or goal to employ these applications is also varied. Therefore, the system provides customization functionality when the users would like to install and deploy an application and also enable monitoring services.

Figure 3:
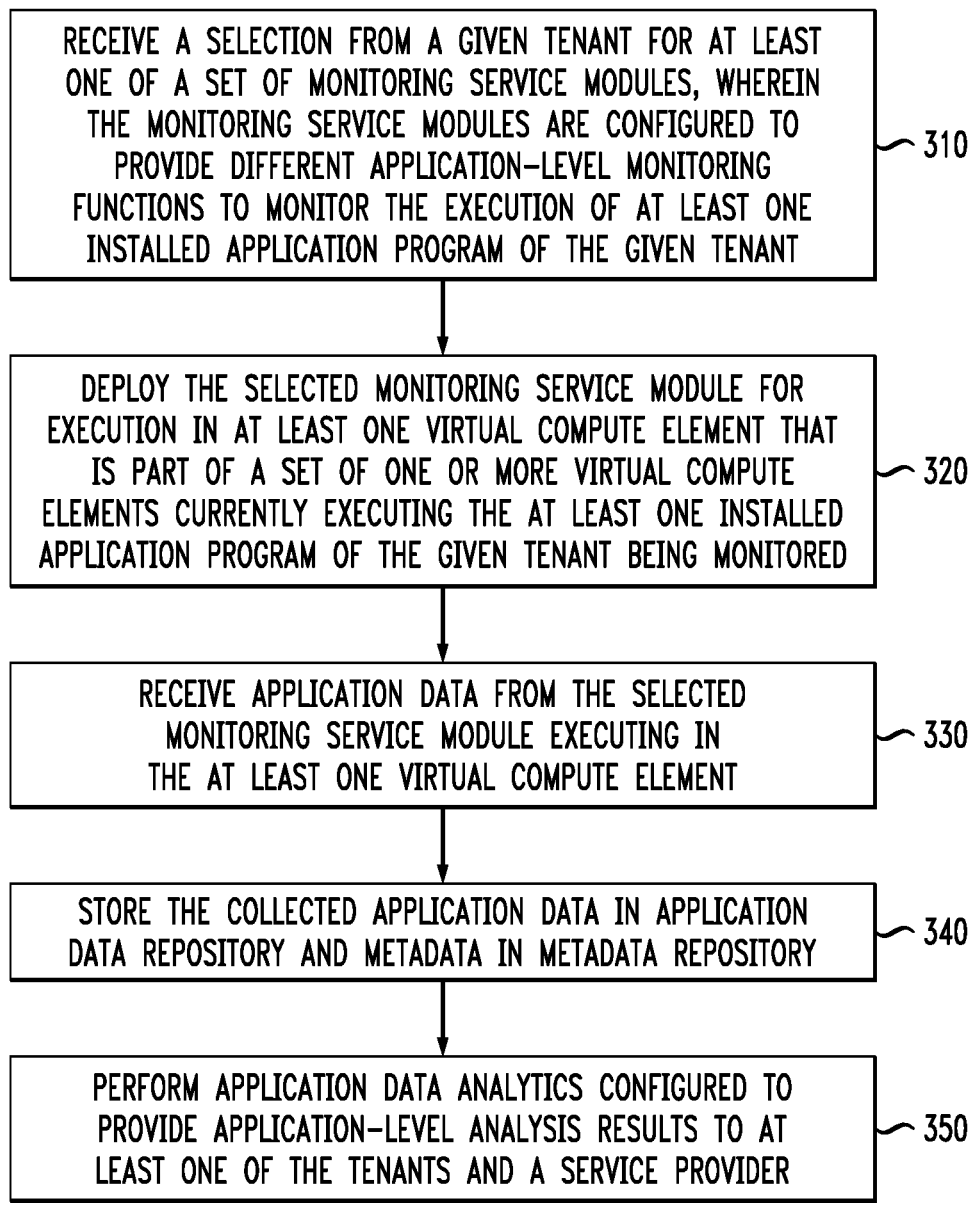
FIG. 3 illustrates an application-level monitoring and profiling methodology, according to an embodiment of the invention.

FIG. 3 illustratively summarizes an application-level monitoring and profiling methodology 300, according to an embodiment of the invention. The methodology 300 may be performed in environment 200 of FIG. 2.

Step 310 receives a selection from a given tenant for at least one of a set of monitoring service modules, wherein the monitoring service modules are configured to provide different application-level monitoring functions to monitor the execution of at least one installed application program of the given tenant.

Step 320 deploys the selected monitoring service module for execution in at least one virtual compute element that is part of a set of one or more virtual compute elements currently executing the at least one installed application program of the given tenant being monitored.

Step 330 receives application data from the selected monitoring service module executing in the at least one virtual compute element.

Step 340 stores the collected application data in application data repository and metadata in metadata repository.

Step 350 performs application data analytics configured to provide application-level analysis results to at least one of the tenants and a service provider.

Figure 4:
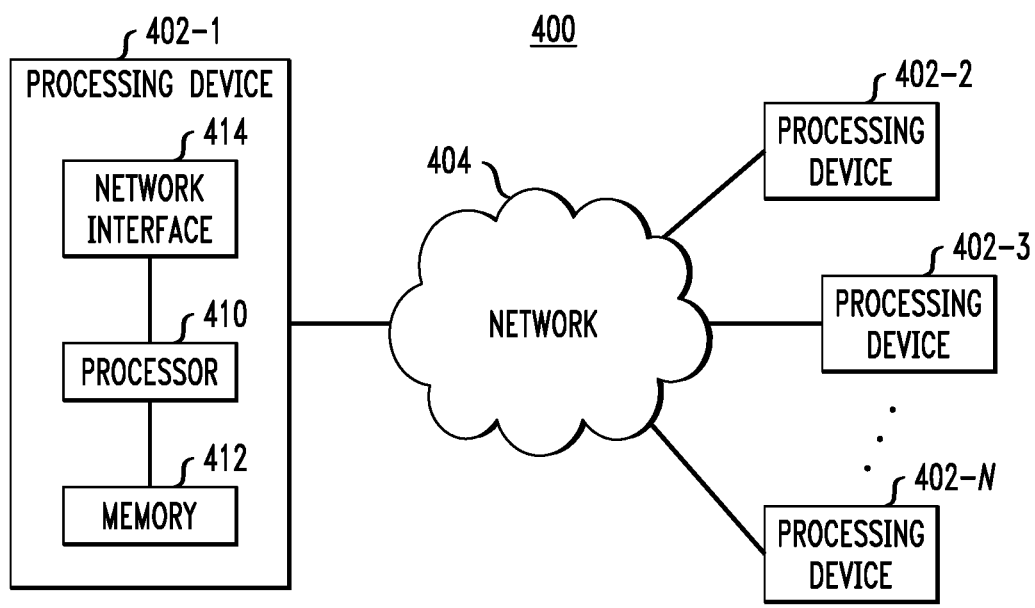
FIG. 4 illustrates a processing platform used to implement an application-level monitoring and profiling service layer and computing platform environment, according to an embodiment of the invention.

As an example of a processing platform on which application-level monitoring and profiling and a corresponding computing platform (e.g., 200 of FIG. 2) can be implemented is processing platform 400 shown in FIG. 4. It is to be appreciated that processing platform 400 may implement the application-level monitoring and profiling layer (modules and functionalities) described herein, as well as the monitored system (e.g., computing platform) itself.

The processing platform 400 in this embodiment comprises a plurality of processing devices, denoted 402-1, 402-2, 402-3, . . . 402-N, which communicate with one another over a network 404. It is to be appreciated that the methodologies described herein may be executed in one such processing device 402, or executed in a distributed manner across two or more such processing devices 402. It is to be further appreciated that a server, a client device, a computing device or any other processing platform element may be viewed as an example of what is more generally referred to herein as a "processing device." As illustrated in FIG. 4, such a device generally comprises at least one processor and an associated memory, and implements one or more functional modules for instantiating and/or controlling features of systems and methodologies described herein. Multiple elements or modules may be implemented by a single processing device in a given embodiment.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 410. Memory 412 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 412 may comprise electronic memory such as random access memory (RAM), read-only memory (ROM) or other types of memory, in any combination. The one or more software programs when executed by a processing device such as the processing device 402-1 causes the device to perform functions associated with one or more of the components/steps of system/methodologies in FIGS. 1-3. One skilled in the art would be readily able to implement such software given the teachings provided herein. Other examples of processor-readable storage media embodying embodiments of the invention may include, for example, optical or magnetic disks.

Processing device 402-1 also includes network interface circuitry 414, which is used to interface the device with the network 404 and other system components. Such circuitry may comprise conventional transceivers of a type well known in the art.

The other processing devices 402 (402-2, 402-3, . . . 402-N) of the processing platform 400 are assumed to be configured in a manner similar to that shown for processing device 402-1 in the figure.

The processing platform 400 shown in FIG. 4 may comprise additional known components such as batch processing systems, parallel processing systems, physical machines, virtual machines, virtual switches, storage volumes, etc. Again, the particular processing platform shown in this figure is presented by way of example only, and the federated web crawling and storage system shown as 400 in FIG. 4 may include additional or alternative processing platforms, as well as numerous distinct processing platforms in any combination.

Also, numerous other arrangements of servers, clients, computers, storage devices or other components are possible in processing platform 400. Such components can communicate with other elements of the processing platform 400 over any type of network, such as a wide area network (WAN), a local area network (LAN), a satellite network, a telephone or cable network, or various portions or combinations of these and other types of networks.

Furthermore, it is to be appreciated that the processing platform 400 of FIG. 4 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 400 in one or more embodiments of the invention is the VMware vSphere (commercially available from VMware Inc., Palo Alto, Calif.) which may have an associated virtual infrastructure management system such as the VMware vCenter. The underlying physical infrastructure may comprise one or more distributed processing platforms that include storage products such as, but not limited to, Isilon, VNX and VPLEX (commercially available from EMC Corporation, Hopkinton, Mass.). A variety of other computing and storage products may be utilized to implement the one or more services that provide the functionality and features described herein.

It was noted above that portions of the system environment 400 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A system, comprising:
    one or more processing devices;
    a computing platform, implemented on the one or more processing devices, the computing platform comprising one or more virtual compute elements, one or more virtual storage elements, and one or more virtual networking elements, wherein one or more application programs of one or more tenants execute on the computing platform;
    an application program monitoring service layer, implemented on the one or more processing devices and operatively coupled to the computing platform, the application program monitoring service layer comprising:
        a set of monitoring service modules selectable by the one or more tenants through an application-level monitoring service module catalog that specifies the set of monitoring service modules available for selection, wherein the monitoring service modules are configured to provide different application-level monitoring functions, for a given tenant, to monitor the execution of at least one installed application program of the given tenant, and wherein a selected monitoring service module executes in at least one virtual compute element that is part of a set of one or more virtual compute elements currently executing the at least one installed application program of the given tenant being monitored and further wherein the set of monitoring service modules is configured to be extendable by at least one of a given tenant and a service provider of the computing platform by adding another monitoring service module or modifying an existing monitoring service module such that application-level monitoring functionalities are customizable based on changing application-level monitoring needs;
        a data collecting service module, operatively coupled to the set of monitoring service modules, wherein the data collecting service module is configured to receive application data from the monitoring service module executing in the at least one virtual compute element that is part of the set of one or more virtual compute elements currently executing the installed application program being monitored; and
        an agreement mechanism for enabling the one or more tenants to expressly agree with a service provider of the computing platform on application-level monitoring functions to be provided in the application program monitoring service layer, wherein the express agreement is performed through the agreement mechanism of the application program monitoring service layer to enable the one or more tenants to control permission for the application-level monitoring functions to be executed on the computing platform maintained by the service provider.

2. The system of claim 1, wherein the application program monitoring service layer further comprises an interface configured to enable a given tenant to select one of the set of monitoring service modules and to access collected application data.

3. The system of claim 2, wherein the interface comprises an application programming interface.

4. The system of claim 3, wherein the application programming interface is configured to support a file transmission protocol.

5. The system of claim 1, wherein the application program monitoring service layer further comprises an application data repository configured to store the application data collected.

6. The system of claim 5, wherein the application data repository is configured to implement multiple data tiers based on the timeliness of the collected application data.

7. The system of claim 6, wherein older collected application data is stored on a different tier than newer collected application data.

8. The system of claim 1, wherein the application program monitoring service layer further comprises a permission control module configured to manage access to at least one of the set of monitoring service modules and the application data obtained therefrom.

9. The system of claim 8, wherein the permission control module is further configured to provide an audit record of previous access to at least one of the set of monitoring service modules and the application data obtained therefrom.

10. The system of claim 1, wherein the application program monitoring service layer further comprises a metadata repository configured to store metadata attributable to the application data collected.

11. The system of claim 10, wherein the metadata attributable to the application data collected further comprises data indicative of one or more of an owner of the collected application data, a source of the collected application data, a time of collection of the collected application data, a metric unit of the collected application data, and a timeliness metric for the collected application data.

12. The system of claim 1, wherein the application program monitoring service layer further comprises application data analytics modules configured to provide application-level analysis results to at least one of the tenants and a service provider of the computing platform.

13. The system of claim 12, wherein the application data analytics modules generate output data indicative of at least one of failure alerts, failure diagnostics, and bottleneck detection.

14. The system of claim 7, wherein the application data repository automatically and periodically performs data retention and data archiving operations.

15. A method comprising:
    in a computing platform, implemented on the one or more processing devices, wherein the computing platform comprises one or more virtual compute elements, one or more virtual storage elements, and one or more virtual networking elements, and wherein one or more application programs of one or more tenants execute on the computing platform;
    expressly agreeing, between the one or more tenants and a service provider of the computing platform, on application-level monitoring functions to be provided in the set of monitoring service modules, wherein the express agreement is performed through an agreement mechanism to enable the one or more tenants to control permission for the application-level monitoring functions to be executed on the computing platform maintained by the service provider;

receiving a selection from a given tenant for at least one of a set of monitoring service modules through an application-level monitoring service module catalog that specifies the set of monitoring service modules available for selection, wherein the monitoring service modules are configured to provide different application-level monitoring functions to monitor the execution of at least one installed application program of the given tenant and further wherein the set of monitoring service modules is configured to be extendable by at least one of a given tenant and a service provider of the computing platform by adding another monitoring service module or modifying an existing monitoring service module such that application-level monitoring functionalities are customizable based on changing application-level monitoring needs;

deploying the selected monitoring service module for execution in at least one virtual compute element that is part of a set of one or more virtual compute elements currently executing the at least one installed application program of the given tenant being monitored; and receiving application data from the selected monitoring service module executing in the at least one virtual compute element that is part of the set of one or more virtual compute elements currently executing the installed application program being monitored.

16. The method of claim 15, further comprising storing the collected application data in an application data repository and storing metadata attributable to the collected application data in a metadata repository.

17. The method of claim 15, further comprising managing access to at least one of the set of monitoring service modules and the application data obtained therefrom.

18. An article of manufacture comprising a processor-readable non-transitory storage medium having encoded therein executable code of one or more software programs, wherein the one or more software programs when executed by one or more processing devices implement steps:

in a computing platform, implemented on the one or more processing devices, wherein the computing platform comprises one or more virtual compute elements, one or more virtual storage elements, and one or more virtual networking elements, and wherein one or more application programs of one or more tenants execute on the computing platform;

expressly agreeing, between the one or more tenants and a service provider of the computing platform, on application-level monitoring functions to be provided in the set of monitoring service modules, wherein the express agreement is performed through an agreement mechanism to enable the one or more tenants to control permission for the application-level monitoring functions to be executed on the computing platform maintained by the service provider;

receiving a selection from a given tenant for at least one of a set of monitoring service modules through an application-level monitoring service module catalog that specifies the set of monitoring service modules available for selection, wherein the monitoring service modules are configured to provide different application-level monitoring functions to monitor the execution of at least one installed application program of the given tenant and further wherein the set of monitoring service modules is configured to be extendable by at least one of a given tenant and a service provider of the computing platform by adding another monitoring service module or modifying an existing monitoring service module such that application-level monitoring functionalities are customizable based on changing application-level monitoring needs;

deploying the selected monitoring service module for execution in at least one virtual compute element that is part of a set of one or more virtual compute elements currently executing the at least one installed application program of the given tenant being monitored; and receiving application data from the selected monitoring service module executing in the at least one virtual compute element that is part of the set of one or more virtual compute elements currently executing the installed application program being monitored.

19. The article of claim 18, wherein the one or more software programs when executed by one or more processing devices further implement the step of storing the collected application data in an application data repository and storing metadata attributable to the collected application data in a metadata repository.

20. The article of claim 18, wherein the one or more software programs when executed by one or more processing devices further implement the step of managing access to at least one of the set of monitoring service modules and the application data obtained therefrom.

* * * * *